April 7, 1931.    E. T. ROSS ET AL    1,799,323
RAT TRAP
Filed Nov. 23, 1927

INVENTOR.
Edward T. Ross and
Frank G. Veatch
BY
Townsend, Loftus + Abbett
ATTORNEYS.

Patented Apr. 7, 1931

1,799,323

UNITED STATES PATENT OFFICE

EDWARD T. ROSS, OF SAN FRANCISCO, AND FRANK G. VEATCH, OF SANTA ROSA, CALIFORNIA

RAT TRAP

Application filed November 23, 1927. Serial No. 235,157.

This invention pertains to animal traps, and is particularly pertinent to spring traps.

The object of this invention is to provide a simple, powerful and inexpensive device for catching animals; to provide especially a trigger device whereby the bait when placed upon the trigger is prevented from being jarred off and is not likely to be dislodged when attacked by animals; and to so design the trigger or bait holding device that much time is saved in baiting the same, and by insuring the proper retention of the bait upon the trigger the frequent loss of bait material is prevented, thus economizing in the use of this material.

It is a particular object of the invention to devise a trigger operated trap in which the trigger is adapted to release the guillotine either when moved upwardly or downwardly by the attacking animal, and which is so designed as to be particularly strong; the whole trap being made to withstand long and constant use.

A further object of our invention is to provide an improved form of trigger or releasing means which will be sensitive to the slightest disturbance and which will not bind or hang due to friction.

The invention consists of the parts and the construction and combination of parts as hereinafter more fully described and claimed, having reference to the accompanying drawings, in which—

Figure 1:
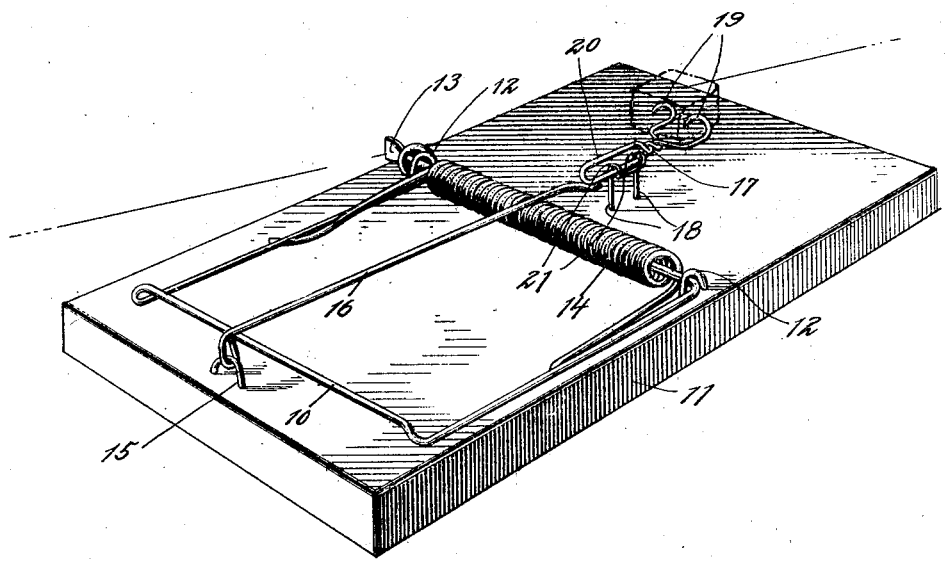
Fig. 1 is a perspective view of our improved trap.
Figure 2:
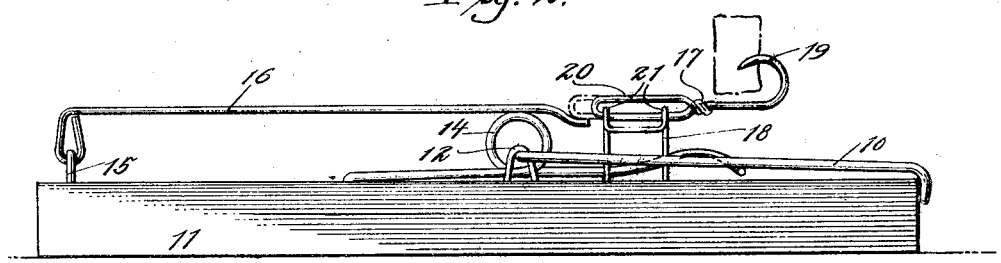
Fig. 2 is a side elevation showing the trigger in its released position.

It is well known that it is the habit of rats and other animals, when attacking material, to gnaw upwardly, and we have found by actual experience that with the common form of guillotine trap the bait is frequently entirely removed from the bait lever or trigger without releasing the guillotine loop. Investigation shows that the ordinary trap is not designed to be operated by an upward pull on the bait, and is only set off when the bait lever or trigger is depressed.

We have actually constructed and successfully operated a number of traps so designed as to release the guillotine loop either upon depression of the lever or trigger or upon its being pulled upwardly. These traps, however, while they operate very satisfactorily when properly set, are of such a nature that they can be and are very often set so that it is practically impossible to release the guillotine. This trap is very sensitive and effective in the hands of an experienced person, but, owing to the above feature, it is often set in an inoperative position and, as a result of failures due to this condition, it has very little appeal to the general public. In order to overcome the above objection, we have designed a trap which is sensitive to both upward, downward, and outward movement of the bait, as will be pointed out more particularly in the following detailed description.

In the drawing we have shown a loop-shaped guillotine 10 pivotally mounted upon a base member 11 by means of suitable bearings 12. An angularly bent transverse rocker arm 13 is formed upon the guillotine 10 and extends through the bearings 12. A powerful resilient device or spring 14 having offset ends is arranged around the rocker arm 13. One of these offset ends reaches forwardly and over one of the side arms of the guillotine 10 and the other arm reaches rearwardly below the transverse rocker arm 13 and is secured to the base 11. This construction is such that when the guillotine loop 10 is forcibly turned upwardly and backwardly upon the base plate 11, it places the spring member 14 under tension which is sufficient to retain an animal between the plate 11 and the arms of the guillotine 10 when the guillotine is in the released position.

In order to retain the guillotine 10 in its up-turned or set position and under tension of the spring 14, there is pivoted at 15 a loose spring retaining lever 16 adapted to be passed over the cross bar of the guillotine 10 and downwardly so that its free end occupies a position somewhat above the spring 14. Thus the energy of the spring is effective upon the loose spring retaining lever 16 close to its fulcrum 15 and exerts an upward thrust on the loose spring retaining lever.

The loose spring retaining lever, forming the releasing mechanism for the guillotine 10, is held in its operative position by a peculiar and especially designed trigger 17 which is pivoted loosely upon a suitable support member 18.

One of the important features of this trap resides in so mounting the trigger 17 that it will release the spring retaining lever 16 on the slightest movement thereof, the bait being so placed with respect to the trigger mounting as to produce the movement necessary irrespective of the direction from which it is approached. In order to accomplish this feature, the trigger 17 is mounted so that it pivots about a center which is nearly axially in line with the end of the loose spring retaining lever 16 and the bait is placed upon the trigger at a point radially displaced from the pivot point so that the trigger 17 will be turned about its pivot upon the slightest movement of the bait. Preferably bait is placed directly above the pivot point so that the trigger will rotate under the weight of the bait, once it is overbalanced. Locating the bait in this position also facilitates the trap baiting operation. In order to firmly hold the bait upon the trigger 17, we provide a pair of parallel upturned and pointed hooks 19 upon which the bait is placed. In the particular embodiment of my invention shown in the drawing the trigger 17 is formed with an elongated loop 20, one side of which passes through the pivot support 18 and forms the engaging surface for the spring retaining lever 16 and the other side is bent back to form the above loop and one of the bait hooks 19. These bait hooks 19, as will be seen, are formed integral with the trigger 17 by twisting the loop forming portion of the wire and bending the ends thereof upwardly to form a pair of parallel hooks. The trigger mounting member 18 engages the lower side of the trigger loop 20 in two places which are axially in alignment so that movement of the trigger is limited to a radial and axial movement only, the radial and axial movement being with respect to the end of the spring retaining lever 16. In the drawing the trigger supporting member 18 is shown as formed of a square-topped staple, the top having been bent back upon itself to form two eyelets 21 through which the lower side of the loop 20 extends. This provides a support for the trigger upon which it can turn and slide substantially as stated.

From the above it will be seen that when the trap is properly baited and set, any movement of the bait will have a tendency to spring the trap. We attribute this feature to the location of the pivot point of the trigger with respect to the engaged surface of the spring retaining lever 16 and the manner of locating and holding the bait. With the trigger pivoted as shown, substantially in alignment with the spring retaining lever 16, it might be said that the trigger rolls out of engagement with the spring retaining lever rather than slides or slips. As a result of this construction there will be no friction between the parts and it will therefore be impossible for the trigger to hang or bind as is the case where the surface of the trigger must slide over the spring retaining lever.

When the trap is baited, the bait will be held rigidly by the hooks 19 so that it cannot be moved without disturbing the trigger. Under these conditions, it will be practically impossible for a rat or other rodent to touch the bait without causing it to turn upon its pivot and spring the trap.

It has been found in territories where campaigns have been waged against vermin, such as rats, field mice, gophers and the like, that a vast amount of bait material is wasted by reason of the fact of its becoming loosened and lost from the bait lever, and also a great deal of time is consumed in properly securing the bait to traps of the ordinary structure. In order to obviate these difficulties and economize in the use of the bait material and facilitate the baiting of the trap, we specially form this hook structure on the lever. This structure of trigger insures a substantial, powerful, practically rust-proof trigger and one having no sharp cutting edges or lips to be worn away, and this is particularly important with reference to that part of the trigger which engages the releasing loose spring-retaining lever 16, because in ordinary traps which are provided with sharp metallic edges, it has been found that these sharp edges will eventually wear seats or notches in the releasing loose spring-retaining lever which have a tendency to increase the friction between the parts and, as a result, cause the trigger to hang.

In addition to the rolling, releasing feature of the trigger, it is possible, by reason of the elongated loop 20, to obtain different degrees of sensitiveness by setting the trigger 17 in different axially displaced positions so that the end of the guillotine retaining lever 16 will engage different points upon the trigger. This feature of the sliding trigger also facilitates setting of the trap, as it allows for adjustment of the trigger to secure a proper seating of the spring-retaining lever.

While we have shown the preferred form of our invention as now known to us, it is to be understood that various changes may be made in its construction without departing from the spirit of the invention as defined in the appended claim.

Having thus described our invention, what we claim and desire to secure by Letters Patent is—

A trap of the character described comprising a spring actuated guillotine and retaining lever therefor, a trigger engageable with said lever, said trigger comprising a supporting member and a lever engaging member, said engaging member being pivotally and slidably mounted with relation to its supporting member.

EDWARD T. ROSS.
FRANK G. VEATCH.